United States Patent
Rong et al.

(10) Patent No.: US 9,766,373 B2
(45) Date of Patent: Sep. 19, 2017

(54) SELECTIVE LIGHT BLOCKING OPTO-PHYSICAL MATERIALS AND OPTICAL DEVICES INCLUDING SUCH SELECTIVE LIGHT BLOCKING OPTO-PHYSICAL MATERIALS

(71) Applicant: Dow Corning Corporation, Midland, MI (US)

(72) Inventors: Wei Rong, Midland, MI (US); Jacob W. Steinbrecher, Midland, MI (US); Michael R Strong, Midland, MI (US); Afrooz A Zarisfi, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 15/100,415

(22) PCT Filed: Oct. 2, 2014

(86) PCT No.: PCT/US2014/058733
§ 371 (c)(1),
(2) Date: May 31, 2016

(87) PCT Pub. No.: WO2015/094455
PCT Pub. Date: Jun. 25, 2015

(65) Prior Publication Data
US 2016/0306076 A1  Oct. 20, 2016

Related U.S. Application Data

(60) Provisional application No. 61/916,608, filed on Dec. 16, 2013.

(51) Int. Cl.
| | | |
|---|---|---|
| C08K 5/00 | (2006.01) |
| G02B 1/04 | (2006.01) |
| C08G 77/20 | (2006.01) |
| C08L 83/04 | (2006.01) |
| C08L 83/14 | (2006.01) |
| C08G 77/12 | (2006.01) |

(52) U.S. Cl.
CPC .............. *G02B 1/04* (2013.01); *C08G 77/20* (2013.01); *C08L 83/04* (2013.01); *C08L 83/14* (2013.01); *C08G 77/12* (2013.01); *C08L 2201/10* (2013.01); *C08L 2205/025* (2013.01); *C08L 2205/03* (2013.01); *C08L 2312/08* (2013.01)

(58) Field of Classification Search
CPC ....... G02B 1/04; C08L 83/04; C08L 2201/10; C08L 2205/025; C08L 2205/03; C08L 2312/08
USPC .......................................................... 524/91
See application file for complete search history.

(56) References Cited

U.S. PATENT DOCUMENTS

| | | |
|---|---|---|
| 5,444,106 A | 8/1995 | Zhou et al. |
| 6,432,137 B1 | 8/2002 | Nanushyan et al. |
| 8,408,663 B2 * | 4/2013 | Chellappan ........... F25D 23/021 312/331 |
| 8,409,663 B2 | 4/2013 | Varaprasad et al. |
| 2001/0115756 | 8/2002 | Lin et al. |
| 2003/0109599 A1 | 6/2003 | Kament |
| 2004/0075893 A1 | 4/2004 | Cornelius |
| 2007/0025678 A1 | 2/2007 | Kushibiki et al. |
| 2009/0088547 A1* | 4/2009 | Schamschurin ....... C08G 77/08 528/14 |
| 2014/0008697 A1* | 1/2014 | Harkness ................ C08L 83/04 257/100 |
| 2014/0174523 A1 | 6/2014 | Ko |
| 2016/0300969 A1 | 10/2016 | Yamakawa et al. |

OTHER PUBLICATIONS

PCT/US2014/058733 ISR Dated Jan. 19, 2015.

* cited by examiner

*Primary Examiner* — Hui Chin
(74) *Attorney, Agent, or Firm* — Matthew T. Fewkes

(57) ABSTRACT

An opto-physical material comprises a curable matrix composition and an effective amount of an ultraviolet light additive dispersed therein. The opto-physical material has a refractive index ranging from 1 to 1.8 at 589 nm wavelength and a light transmission value of 30% or less at any wavelength in the ultraviolet light spectrum. In addition, a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, wherein the optical physical property is selected from color shift in the visible light spectrum, light diffusivity at any wavelength in the light spectrum, light transmission in the visible light spectrum, and combinations thereof.

16 Claims, No Drawings

SELECTIVE LIGHT BLOCKING OPTO-PHYSICAL MATERIALS AND OPTICAL DEVICES INCLUDING SUCH SELECTIVE LIGHT BLOCKING OPTO-PHYSICAL MATERIALS

CROSS REFERENCE TO RELATED APPLICATIONS

This application is a U.S. national stage filing under 35 U.S.C. §371 of PCT Application No. PCT/US14/58733 filed on 2 Oct. 2014, currently pending, which claims the benefit of U.S. Provisional Patent Application No. 61/916608 filed 16 Dec. 2013 under 35U.S.C. §119 (e). PCT Application No. PCT/US14/58733 and U.S. Provisional Patent Application No. 61/916608 are hereby incorporated by reference.

FIELD OF THE INVENTION

The present invention generally relates to selective light blocking opto-physical materials, and more specifically to opto-physical materials comprising a curable matrix composition and an effective amount of an ultraviolet light additive dispersed therein and having a refractive index ranging from 1 to 1.8 at 589 nm wavelength and a light transmission value of 30% or less in the ultraviolet light spectrum.

DESCRIPTION OF THE RELATED ART

There is a continuing need for transparent or light diffusive materials with desirable optical physical properties for various optical device applications. In general, these materials allow both ultraviolet and visible light transmission therethrough. However, the ultraviolet light transmission (i.e., light of wavelengths from 10 nm to 405 nm) through these materials may cause problems with the underlying components or materials.

For example, in outdoor lighting or light emitting diode signs in which light emitting diodes (LEDs) are mounted on a circuit board which has a solder mask on the surface, the ultraviolet light radiating from the sun can react with the solder mask, causing the solder mask to darken and lessen the visible light output from the LED.

Similarly, for the building industry, the transmission of ultraviolet light from the sun through glass windows and into the interior of a building can cause fabrics used in curtains, furniture, and carpets to fade over time.

Thus, there is an unmet need for selective blocking of ultraviolet light without an associated decrease or shift in optical physical properties through these materials.

SUMMARY OF THE INVENTION

The present invention provides an opto-physical material comprising a curable matrix composition and an effective amount of an ultraviolet light additive dispersed therein, with the opto-physical material having a refractive index ranging from 1 to 1.8 at 589 nm wavelength and a light transmission value of 30% or less at any wavelength in the ultraviolet light spectrum. The effective amount of the ultraviolet light additive dispersed in the curable matrix composition is set wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive. The optical physical property is selected from color shift in the visible light spectrum (using the CIELAB color scale), light diffusivity at any wavelength in the light spectrum, light transmission in the visible light spectrum (i.e., light of wavelengths from 405 nm to 700 nm), and combinations thereof.

The opto-physical material may be used in various applications, including for use in optical devices and applications. In this regard, the present invention provides an optical device that includes a substrate and an opto-physical material disposed on the substrate.

The present invention also provides a method for forming the optical device comprising providing the opto-physical material as described above and disposing the opto-physical material on a substrate.

DETAILED DESCRIPTION OF THE INVENTION

The present invention provides a curable matrix composition having an effective amount of an ultraviolet light additive dispersed therein. The present invention also provides an opto-physical material comprising the curable matrix composition.

Such opto-physical materials are useful in various applications, including for use in optical devices or non-optical devices to provide such materials with enhanced ultraviolet light protection without significantly altering the optical physical properties of the device in the visible light spectrum in terms of color shift, light diffusivity, and light transmission. As such, the present invention also provides a method for forming an optical device that includes the opto-physical material.

Alternatively, the opto-physical material may also be used in non-optical devices and applications, e.g. as a sealant, adhesive or filler.

The curable matrix composition includes (A) an organopolysiloxane having an average of greater than one aliphatically unsaturated organic group per molecule; (B) a crosslinker having an average of at least two silicon-bonded hydrogen atoms per molecule; and (C) a hydrosilylation catalyst. In certain embodiments, the curable matrix composition also includes (D) a silicone resin having aliphatically unsaturated organic groups present in an amount, on average, ranging from 0.1 to 3.0 weight percent based upon the total weight of the silicone resin.

In certain embodiments, wherein the curable matrix composition is cured to form an opto-physical material having a Shore A hardness of at least 40, the molar ratio of silicon-bonded hydrogen atoms in the crosslinker (B) to the aliphatically unsaturated organic groups in components (A) and (D) has a value ranging from 1.0/1 to 3.0/1.

In certain other embodiments, wherein the curable matrix composition is cured to form an opto-physical material having a Shore A hardness less than 20, the molar ratio of silicon-bonded hydrogen atoms in the crosslinker (B) to the aliphatically unsaturated organic groups in components (A) and (D) has a value ranging from 0.1/1 to 1.0/1

As noted above, the curable matrix composition also includes an effective amount of (E) an ultraviolet light additive that is dispersed within components (A), (B), (C) and optionally (D) prior to curing. An "effective amount" of ultraviolet light additive (E), as defined herein, refers to an amount of ultraviolet light additive (E) that provides the opto-physical material with a light transmission value of 30% or less at any wavelength in the ultraviolet light spectrum but does not alter the optical physical properties of the opto-physical material in the visible light spectrum by more than 5% from the optical physical properties as compared with an opto-physical material formed from the same curable matrix composition but not including an ultraviolet light additive. Such optical physical properties color shift, light diffusivity, and light transmission in the visible light spectrum, and combinations thereof.

In certain embodiments, the curable matrix composition may also include other optional components (i.e., in addition to components (A)-(E)). Each of the components (A)-(E) and other optional components is described below.

Component (A) comprises an organopolysiloxane having an average of greater than one aliphatically unsaturated organic group per molecule.

An aliphatically unsaturated organic group, as defined herein, includes any carbon-containing functional group that includes, on average, at least one carbon-carbon double bond or carbon-carbon triple bond. In certain embodiments, for example, the aliphatically unsaturated organic groups are aliphatically unsaturated hydrocarbon groups.

The aliphatically unsaturated organic groups in component (A) may be alkenyl exemplified by, but not limited to, vinyl, allyl, butenyl, pentenyl, and hexenyl; alternatively vinyl. The aliphatically unsaturated organic groups may be alkynyl groups exemplified by, but not limited to, ethynyl, propynyl, and butynyl. The aliphatically unsaturated organic groups in component (A) may be located at terminal, pendant, or both terminal and pendant positions. Alternatively, the aliphatically unsaturated organic groups in component (A) may be located at terminal positions of the at least one organopolysiloxane.

The remaining silicon-bonded organic groups that may also be present in the organopolysiloxanes of component (A) may be substituted and unsubstituted hydrocarbon groups free of aliphatic unsaturation. Monovalent unsubstituted hydrocarbon groups are exemplified by, but not limited, to alkyl groups such as methyl, ethyl, propyl, pentyl, octyl, undecyl, and octadecyl; cycloalkyl groups such as cyclohexyl. Monovalent substituted hydrocarbon groups are exemplified by, but not limited to halogenated alkyl groups such as chloromethyl, 3-chloropropyl, and 3,3,3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3, 3-heptafluoropentyl, 6,6,6,5,5,4,4,3,3-nonafluorohexyl, and 8,8,8,7,7-pentafluorooctyl.

In certain embodiments, component (A) comprises (A1) a first organopolysiloxane having an average of at least one aliphatically unsaturated organic groups per molecule and having a viscosity of up to 15,000 mPa·s (measured at 25 degrees Celsius), and (A2) a second organopolysiloxane having an average of at least two aliphatically unsaturated organic groups per molecule and having a viscosity of at least 2,000 mPa·s (measured at 25 degrees Celsius).

Component (A1) can be an organopolysiloxane or a combination comprising two or more organopolysiloxanes having an average of at least one aliphatically unsaturated organic group per molecule that differ in at least one of the following properties: structure, average molecular weight, siloxane units, and sequence. As noted above, the viscosity of component (A1) is up to 15,000 mPa·s (measured at 25 degrees Celsius). Alternatively, the viscosity of component (A1) may range from 100 mPa·s to 12,000 mPa·s, alternatively from 200 mPa·s to 2,500 mPa·s, and alternatively from 300 mPa·s to 2,000 mPa·s (measured at 25 degrees Celsius). The amount of component (A1) in the composition may range from 0.1% to 90%, alternatively 60% to 80%, based on the combined weight of components (A1) and (A2).

In certain embodiments, component (A1) has the general formula (I): $R^1_3SiO-(R^1_2SiO)_a-SiR^1_3$, wherein $R^1$ is independently an aliphatically unsaturated organic group or a monovalent substituted or unsubstituted hydrocarbon group as described above and the subscript a is an integer having a value sufficient to provide component (A1) with a viscosity up to 15,000 mPa·s as measured at 25 degrees Celsius. Alternatively, formula (I) may be an $\alpha,\omega$-dialkenyl-functional organopolysiloxane.

Component (A2) can be an organopolysiloxane or a combination comprising two or more organopolysiloxanes having an average of at least two aliphatically unsaturated organic groups per molecule that differ in at least one of the following properties: structure, average molecular weight, siloxane units, and sequence. As noted above, the viscosity of component (A2) is at least 2,000 mPa·s (measured at 25 degrees Celsius). Alternatively, the viscosity of component (A2) may range from 7,000 mPa·s to 10,000,000 mPa·s, alternatively 10,000 mPa·s to 100,000 mPa·s, and alternatively 45,000 to 65,000 mPa·s (measured at 25 degrees Celsius). The amount of component (A2) in the composition may range from 10% to 99.9%, alternatively 20% to 40%, based on the combined weight of components (A1) and (A2).

In certain embodiments, component (A2) has the general formula (II): $R^2_3SiO-(R^2_2SiO)_b-SiR^2_3$, wherein each $R^2$ is independently an aliphatically unsaturated organic group or a monovalent substituted or unsubstituted hydrocarbon group as described above and the subscript b is an integer having a value sufficient to provide component (A2) with a viscosity of at least 2,000 mPa·s as measured at 25 degrees Celsius. Alternatively, formula (II) may be an $\alpha,\omega$-dialkenyl-functional organopolysiloxane.

Component (B) is a crosslinker having an average, per molecule, of at least two silicon-bonded hydrogen atoms. Component (B) may comprise a polyorganohydrogensiloxane or a resinous organohydrogen silica structure. Component (B) can be a single polyorganohydrogensiloxane or resinous organohydrogen silica structure or a combination comprising two or more polyorganohydrogensiloxanes or resinous organohydrogen silica structures that differ in at least one of the following properties: structure, viscosity, average molecular weight, siloxane units, and sequence.

In certain embodiments, component (B) is a linear polyorganohydrogensiloxane of general formula (IV): $R^3_3SiO-(R^3_2SiO)_c-SiR^3_3$, where each $R^3$ is independently a hydrogen atom, or a monovalent organic group or a monovalent hydrocarbon group, which is a monovalent substituted or unsubstituted hydrocarbon group, with the proviso that on average at least two $R^3$ per molecule are hydrogen atoms, and subscript c is an integer with a value of 1 or more. Alternatively, at least three $R^3$ per molecule are hydrogen atoms and c may range from 1 to 20, alternatively 1 to 10. Component (B) may comprise a hydrogen terminated organopolysiloxane. Alternatively, component (B) may comprise a poly(dimethyl/methylhydrogen)siloxane copolymer with or without terminal silicon-bonded hydrogens.

In certain embodiments, $R^3$ may be a monovalent unsubstituted hydrocarbon group, exemplified by alkyl groups such as methyl, ethyl, propyl, pentyl, octyl, undecyl, and octadecyl; alkenyl groups, such as vinyl, allyl, butenyl, pentenyl and hexenyl; cycloaliphatic radicals, such as cyclohexyl and cyclohexenylethyl; and alkynyl groups such as, ethynyl, propynyl, and butynyl; cycloalkyl groups such as cyclopentyl and cyclohexyl. Non-reactive substituents that can be present on $R^3$ include but are not limited to halogen and cyano. Monovalent organic groups which are substituted hydrocarbon groups are exemplified by, but not limited to halogenated alkyl groups such as chloromethyl, 3-chloropropyl, and 3,3,3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl.

Alternatively, in certain embodiments, component (B) is a branched polyorganohydrogensiloxane of the unit formula (III): $(R^4SiO_{3/2})_d(R^4{}_2SiO_{2/2})_e(R^4{}_3SiO_{1/2})_f(SiO_{4/2})_g$, wherein the subscripts d, e, f, and g represent mole fractions. In formula (III), each $R^4$ is independently a hydrogen atom or a monovalent organic group or a monovalent hydrocarbon group, which is a monovalent substituted or unsubstituted hydrocarbon group as exemplified above for $R^3$, with the proviso that an average of at least two per molecule of $R^4$ are hydrogen atoms. Further, in the branched polyorganohydrogensiloxane of formula (III), 0.1 mol % to 90 mol % of $R^4$ may be silicon-bonded hydrogen atoms. In addition, the subscript f is a positive number and each subscript e, d and g can be zero or a positive number such that d+g is a positive number and such that d+e+g+f is one.

In certain embodiments, component (B) comprises $R^5{}_3SiO_{1/2}$ units and $R^5{}_2SiO_{2/2}$ units, wherein each $R^5$ is independently a hydrogen atom or a monovalent organic group or a monovalent hydrocarbon group, which is a monovalent substituted or unsubstituted hydrocarbon group as exemplified above for $R^3$, with the proviso that on average at least two $R^5$ per molecule are hydrogen.

In certain other embodiments, component (B) comprises $R^6{}_3SiO_{1/2}$ units, $R^6{}_2SiO_{2/2}$ units, and $R^6SiO_{3/2}$ units, wherein each $R^6$ is independently a hydrogen atom or a monovalent organic group or a monovalent hydrocarbon group, which is a monovalent substituted or unsubstituted hydrocarbon group as exemplified above for $R^3$, with the proviso that on average at least two $R^6$ per molecule are hydrogen.

In still other embodiments, component (B) comprises $R^7{}_3SiO_{1/2}$ units and $SiO_{4/2}$ units, wherein each $R^7$ is independently a hydrogen atom or a monovalent organic group or a monovalent hydrocarbon group, which is a monovalent substituted or unsubstituted hydrocarbon group as exemplified above for $R^3$, with the proviso that on average at least two $R^7$ per molecule are hydrogen.

The concentration of component (B) in the curable matrix composition is sufficient to cure (i.e., cross-link) the composition.

In certain embodiments, wherein the curable matrix composition is cured to form the opto-physical material having a Shore A hardness of at least 40, the molar ratio of silicon-bonded hydrogen atoms in the crosslinker (B) to the aliphatically unsaturated organic groups in components (A) and optional component (D) has a value ranging from 1.0/1 to 3.0/1.

In certain other embodiments, wherein the curable matrix composition is cured to form the opto-physical material having a Shore A hardness of less than 20, the molar ratio of silicon-bonded hydrogen atoms in the crosslinker (B) to the aliphatically unsaturated organic groups in components (A) and optional component (D) has a value ranging from 0.1/1 to 1.0/1.

The composition additionally comprises (C) a hydrosilylation catalyst. The hydrosilylation catalyst (C) promotes the reaction between the crosslinker (B) and component (A) and optional component (D). The hydrosilylation catalyst (C) can be any hydrosilylation catalyst, including any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxane disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst (C) can also be a supported hydrosilylation catalyst comprising a solid support having a platinum group metal on the surface thereof. The solid support may comprise particulate carbon, silica or aluminum. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, completing ligand, and thermoplastic resin.

The concentration of the hydrosilylation catalyst (C) is sufficient to catalyze the addition reaction of the crosslinker (B) and components (A) and (D). The concentration of the hydrosilylation catalyst (C) is sufficient to provide typically from 0.01 to 1000 ppm of platinum group metal, alternatively from 0.5 to 100 ppm of platinum group metal, alternatively from 1 to 25 ppm of platinum group metal, based on the combined weight of components (A), (B) and (D).

The curable matrix composition, in certain embodiments, optionally includes a silicone resin (D) having aliphatically unsaturated organic groups.

In certain embodiments, when present, the silicone resin (D) has aliphatically unsaturated organic groups present in an amount ranging on average from 0.1 to 3.0% based on the weight of the silicone resin (D) (i.e., 0.1 to 3.0 wt %). Alternatively, when present, the amount of aliphatically unsaturated organic groups in the silicone resin (D) may range from 1.0% to 3.0%, alternatively 1.5% to 3.0%, and alternatively 1.5% to 2.0% on the same basis.

In certain embodiments, when present, the silicone resin (D) having aliphatically unsaturated organic groups is present in an amount ranging from 0.1 to 3.0 wt % comprises $R^8SiO_{3/2}$ units and/or $SiO_{4/2}$ units in combination with $R^8{}_3SiO_{1/2}$ units and/or $R^8{}_2SiO_{2/2}$ units, wherein $R^8$ is independently a monovalent organic group or a monovalent hydrocarbon group, which is a monovalent substituted or unsubstituted hydrocarbon group as exemplified above for $R^3$. As readily understood in the art, $R^8_3SiO_{1/2}$ units are M units, $R^8_2SiO_{2/2}$ units are D units, $R^8SiO_{3/2}$ units are T units, and $SiO_{4/2}$ units are Q units. Accordingly, the silicone resin (D) may be an MQ resin, an MDT resin, or any useful combination of these different units. Two or more different types of silicone resins may be utilized in combination with one another in the silicone resin (D) of the composition. In certain embodiments, the silicone resin (D) comprises an MQ resin. In these embodiments, the molar ratio of M units to Q units in the MQ resin may vary based on the desired physical properties of the silicone resin (D).

In these embodiments comprising $R^8_3SiO_{1/2}$ units and $SiO_{4/2}$ units, the silicone resin (D) having aliphatically unsaturated organic groups present in an amount ranging from 0.1 to 3.0 wt % may have a ratio of M units to Q units (M:Q ratio) ranging from 0.5:1 to 2.0:1. The silicone resin (D) comprising $R^8_3SiO_{1/2}$ units and $SiO_{4/2}$ units may have a number average molecular weight ranging from 1,000 to 10,000 alternatively ranging from 3,000 to 6,000. The number-average molecular weight ($M_n$) may be determined by gel permeation chromatography employing a low angle laser light scattering detector, or a refractive index detector and silicone resin (MQ) standards.

The silicone resin (D) can be prepared by any suitable method. The silicone resin (D) may be one silicone resin. Alternatively, the silicone resin (D) may comprise two or more silicone resins, where the resins differ in at least one of the following properties: structure, hydroxyl and/or hydrolyzable group content, molecular weight, siloxane units, and sequence.

The amount of silicone resin (D) in the curable matrix composition may vary depending on the type and amounts of polymers present, and the aliphatically unsaturated organic groups (e.g., vinyl) content of components (A) and (D), however, the amount of silicone resin (D) may range from 0% to 50%, alternatively from 25% to 45%, based upon the total combined weight of components (A)-(D) of the curable matrix composition.

Component (E) is an ultraviolet light additive that is added to, and dispersed within, the curable matrix composition in an amount sufficient to reduce the ultraviolet light transmission through the cured layer in the range between about 405 nm and 10 nm (i.e., in the ultraviolet light spectrum range) to below 30% light transmission at any wavelength.

Component (E) is also added in an amount that will result in little or no reduction in terms of at least one optical physical property of the opto-physical material (i.e., the cured layer) when compared with the target properties of the opto-physical material formed without component (E). More specifically, component (E) is added to the curable matrix composition in an amount such that a test value of an optical physical property for the opto-physical material does not change by more than 5% from a predetermined value of the optical physical property for an opto-physical material formed from the same curable matrix composition without component (E), wherein the optical physical property is selected from color shift in the visible light spectrum, light diffusivity at any wavelength in the light spectrum, light transmission in the visible light spectrum, and combinations thereof. The predetermined value of the optical physical property is measured for the opto-physical material formed from the curable matrix composition according to the present invention but lacking the ultraviolet light additive (i.e., the opto-physical material is formed from a curable matrix composition having components (A)-(C) and optionally (D) as described above, but without component (E)).

The predetermined value of the optical physical property is measured under the same conditions as used for measuring the test value. Non-limiting examples of the measurement conditions are thickness of the layers, temperature, wavelength of light, intensity of light, etc. The difference between the test value and the predetermined value may be 5% or less (i.e., no more than 5%), alternatively 0 to 5%, alternatively 0 to 3%, alternatively 0 to 1%.

Furthermore, the addition of the ultraviolet light additive (E) should be in an amount that does not prevent the curable matrix composition from curing to form the opto-physical material having the target optical and physical properties as noted above.

In certain embodiments, the ultraviolet light additive (E) comprises an ultraviolet light absorbing compound (UVA), a nanoparticulate light scattering agent, a nanoparticulate light absorbing agent, or any combination thereof. In certain embodiments, a light stabilizer such as a hindered amine light stabilizer (HALS) may also be used in combination with the other UV light additives described above. In certain other embodiments, the ultraviolet light additive may include more than one ultraviolet light additive of a single type from the list above.

The ultraviolet light absorbing compounds (also known as ultraviolet light filters) of the present invention preferably have a high absorptivity of ultraviolet radiation for wavelengths up to about 405 nm (i.e., for wavelengths in the ultraviolet light spectrum) and encompass compounds such as, for example, substituted and unsubstituted benzophenones, benzotriazoles, cyanoacrylates, and hydroxyphenyltriazines. For example, suitable light absorbing compounds include a variety of hydroxybenzophenones, hydroxyphenyltriazines (HPT), and hydroxybenzotriazoles. Preferred ultraviolet light absorbing compounds include commercially available compounds under the trade name Tinuvin® by BASF Corporation of Florham Park, N.J., including Tinuvin® 384-2 (a liquid hydroxybenzotriazole UV light absorbing compound), Tinuvin® 479 (a hydroxyphenyltriazine UV light absorbing compound) and Tinuvin® 400 (a liquid hydroxyphenyltriazine (HPT) UV light absorbing compound). Other suitable ultraviolet light absorbing compounds that may be utilized are disclosed, for example, in U.S. Patent Application No. 2006/0007519 A1, the disclosure of which is hereby incorporated by reference.

The light stabilizer of the present invention, if included, functions to protect the opto-physical material from photochemical degradation through their ability to scavenge radicals produced by weathering or light radiation. The light stabilizers of the present invention, in certain embodiments, can be hindered amine light stabilizers (HALS) that are extremely efficient stabilizers against light-induced degradation in polymer compositions. Exemplary HALS compounds include, but are not limited to, oligomeric or substituted HALS; derivatives of 2,2,6,6,-tetramethylpiperidine; 3,3,5,5-tetramethylmorpholine; 2,2,4,6,6-pentamethylpiperazine; and bis (1,1-dimethylethyl)amine. Suitable commercially available hindered amine light stabilizers include, but are not limited to, compounds based on an amino-ether functionality available sold under the trade name Tinuvin® by BASF Corporation of Florham Park, N.J., including Tinuvin® 123 (decanedioic acid, bis 2,2,6, 6-tetramethyl-1-(octyloxy)-4-piperidinyl) ester) and Tinuvin® 292 (bis (1,2,2,6,6-pentamethyl-4-piperidyl sebacate and methyl 1,2,2,6,6-pentamethyl-4-piperidyl sebacate). Other suitable light stabilizers that may be utilized are disclosed, for example, in U.S. Patent Application No. 2006/0007519 A1, the disclosure of which is hereby incorporated by reference.

Suitable nanoparticulate ultraviolet light absorbing agents or nanoparticulate ultraviolet light scattering agents include, but are not limited to, titanium dioxide ($TiO_2$), magnesium oxide (MgO) and silicon dioxide ($SiO_2$).

The curable matrix composition of the present invention can comprise additional optional ingredients. Examples of additional optional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649, the disclosure of which is hereby incorporated by reference; dyes; pigments; antioxidants; heat stabilizers; flame resistant additives, UV tracers; and flow control additives.

Further, the curable matrix composition may also include an optically active agent such as optical diffusants, phosphor powders, photonic crystals, quantum dots, carbon nanotubes, dyes such as fluorescent dyes or absorbing dyes, and combinations thereof. The exact amount of the optically active agent depends on the specific optically active agent selected, however, the optically active agent may be added to the curable matrix composition in an amount ranging from 0% to 20%, alternatively 0.1% to 10% based on the weight of the curable matrix composition. The optically active agent may be mixed with the curable matrix composition or coated on a surface of the optical device prepared by curing the curable matrix composition to an opto-physical material.

Of course, while the present invention provides curable matrix compositions for forming cured layers having optical physical properties and other physical properties as described herein (and their use in optical devices), it is contemplated that there are other curable matrix compositions (having additional components or formed from chemically different components) that are cured to form a cured layer that can achieve such optical physical properties and other physical properties.

The opto-physical material (i.e., the cured layer) above may be obtained by curing at room temperature, or with heating, the curable matrix composition above. However, heating may accelerate curing. The exact time and temperature for heating will vary depending on various factors including the amount of catalyst and the type and amount of inhibitor present (if any), however curing may be performed by heating the curable matrix composition at a temperature ranging from 50° C. to 200° C. for an amount of time ranging from several seconds to several hours, more typically 5 minutes to 1 hour.

As noted above, the inclusion of the ultraviolet light additive (E) dispersed in the curable matrix composition of the present invention is present in an amount that reduces light transmission in the ultraviolet light spectrum (from about 10 nm to 405 nm) through the opto-physical material to 30% or less light transmission. At the same time, the ultraviolet light additive (E) is added to the curable matrix composition in an amount provided that a predetermined value of an optical physical property for the opto-physical material does not change by more than 5% as compared with an opto-physical material formed from a curable matrix composition lacking the ultraviolet light additive (E), wherein the optical physical property is selected from color shift, light diffusivity, light transmission in the visible light spectrum, and combinations thereof.

As defined herein, a light transmission value in the ultraviolet light spectrum is obtained by transmitting light of a certain wavelength within the ultraviolet light spectrum (i.e., from 10 to 405 nm) through the opto-physical material and measuring the light transmittance value using a Konica Minolta CM-5 Spectrophotometer. Similarly, the light transmission value in the visible light spectrum is obtained by transmitting light of a certain wavelength within the visible light spectrum (i.e., from 405 nm to 700 nm) through the opto-physical material and measuring the light transmittance value using a Konica Minolta CM-5 Spectrophotometer Thus, in certain embodiments, when the opto-physical material is optically clear and has a desired light transmission value in the visible light spectrum in the absence of the ultraviolet light additive (E), the addition of the ultraviolet light additive (E) in an amount sufficient to reduce the light transmission value in the ultraviolet light spectrum to 30% or less but does not change a light transmission value of the opto-physical material in the visible light spectrum by more than 5% from the predetermined light transmission value. For example, if the predetermined light transmission value at 450 nm of the opto-physical material formed from a curable matrix composition having components (A)-(D), but without component (E), is measured at 95% light transmission, then the acceptable light transmission value of the opto-physical material formed from the curable matrix composition having components (A)-(E), measured at 450 nm, may vary from 90.25-99.75% light transmission.

Similarly, when the opto-physical material has desired light diffusion properties (i.e., a desired light diffusivity value) in the absence of the ultraviolet light additive (E), the addition of the ultraviolet light additive (E) in an amount sufficient to reduce the light transmission value to 30% in the ultraviolet light spectrum does not change a light diffusivity value of the opto-physical material in the visible light spectrum by more than 5% from the predetermined light diffusivity value.

As defined herein, diffuse transmission is a measure of the amount of light scattered while passing through a material, such as the opto-physical material. This diffusivity value is indirectly measured by haze, which is a measure of the diffuse transmission relative to the total transmission. Haze ($\lambda$) can be given for a specific wavelength or over an entire spectrum or it can be spectrally weighted as described in ASTM D 1003-00.

For example, if the predetermined critical diffuse transmission value of the opto-physical material formed from the curable matrix composition having components (A)-(D) as described above, but without component (E), is measured at 5%, then the acceptable critical diffuse transmission value of the opto-physical material formed from the curable matrix composition having components (A)-(E) above may vary from 4.75% to 5.25%.

Further, when the cured layer has a desired color in the absence of the ultraviolet light additive (E), the addition of the ultraviolet light additive (E) in an amount sufficient to reduce the light transmission value to 30% or less in the ultraviolet light spectrum does not shift the color value of the cured layer in the visible light spectrum by more than 5% from the predetermined color value. Stated another way, the color shift value does not exceed 5%.

As defined herein, the color for the cured layer is expressed using the CIELAB scale of color measurement using the standard D65 illuminant, wherein $L^*$ defines a lightness value of the cured layer, $a^*$ denotes the red/green value of the cured layer, and b* denotes the yellow/blue value of the cured layer. A color shift change of more than 5%, as defined herein, refers to a change in a pre-defined combination of critical color value(s) L*, a*, or b* by more than 5% (i.e., the opto-physical material formed from the curable matrix composition having components (A)-(E)) from the predetermined color value (i.e., the opto-physical material formed from the curable matrix composition having components (A)-(D)).

In certain embodiments, the addition of the ultraviolet light additive (E) to the curable matrix composition forms an opto-physical material in which the change in value of more than one of these optical physical properties described above for the opto-physical material does not exceed 5% from the predetermined value. For example, in certain embodiments, both the change in the light transmission value and color shift of the opto-physical material in the visible light spectrum does not exceed 5% from the respective predetermined light transmission value and predetermined color value.

In addition, the opto-physical material formed by curing the curable matrix composition of the present invention has a refractive index ranging from 1 to 1.8 at 589 nm, such as from 1 to 1.5 at 589 nm, such as from 1.2 to 1.5 at 589 nm. In order to achieve a refractive index ranging from 1 to 1.8 at 589 nm in the cured layer, in certain embodiments of the present invention, each of the polymer or resin components of the curable matrix composition, including components (A)-(C) as described above, are essentially free of aryl groups. As defined herein, the term "essentially free of aryl groups" is meant to describe wherein aryl groups are not intentionally included as a part of any of the components of the curable matrix composition. In alternative embodiments, a small or residual amount of aryl groups may be included on one or more of the polymer or resin components, including components (A)-(D), of the curable matrix composition provided that the resultant cured layer, as described above, has refractive index of 1 to 1.8 at 589 nm.

Also, in certain embodiments, the opto-physical material has a Shore A hardness value of at least 40, alternatively from 40 to 95, as measured according to ASTM D2240 by the type A durometer. In certain of these embodiments, the opto-physical material having a Shore A hardness of at least 40 also provides a tack free outer surface. A tack free opto-physical material, as defined herein, refers to an opto-physical material that has an outer surface that is sufficiently robust to resist damage by touch. Stated another way, the outer surface of the opto-physical material is not sticky, adhesive, or otherwise gummy to the touch.

Alternatively, in other embodiments, the opto-physical material has a Shore A hardness value of less than 20, alternatively a Shore 00 value from 20 to 50, as measured according to ASTM D2240 by the type A or type 00 durometer The curable matrix composition and associated opto-physical material described above may be used to fabricate optical devices.

The term "optical device" or "optical device application", as defined herein, refers to any device capable of producing, conducting or controlling light. For example, such optical devices may be devices that produce and/or control light such as an optical waveguides, optical lenses, mixing chambers, lighting reflectors, light engines, troffers, optical cameras, photo-couplers, charged couplers, lightguides, light sensing elements, and LED packages such as high brightness LED (HBLED) housings. The optical device could also refer to other devices that merely control light passing there through, such as glass windows for a building.

The optical device, in certain embodiments, is formed by disposing the opto-physical material, formed from the curable matrix composition as described above, on a substrate. In certain embodiments, the curable matrix composition may be applied to the substrate and cured to form the opto-physical material disposed on the substrate, or alternatively the curable matrix composition may first be cured to form the opto-physical material which is subsequently disposed on the substrate.

The substrate, as defined herein, refers to any individual component of an optical device, any collection of components of the optical device, or the entirety of the optical device, that is subjected to ultraviolet light during use. Such ultraviolet light may be internal or external to the optical device.

Thus, in certain embodiments, the substrate may refer to a covering that protects the underlying components of the optical device, including the functional components, but otherwise provides no optical function for the optical device, although such substrates may aid in protecting the optical device from ultraviolet light.

Alternatively, the substrate may refer to portions of the optical device that control light that is produced from other functional components of the optical device, and hence defines an optical function (other than ultraviolet light protection) for the optical device. These portions of the optical device may be coverings, similar to those described above, which also function to shape or otherwise transform the light passing there through. Thus, for example, the covering may refer to lens of a light emitting diode (LED), or to a lightguide, wherein the covering serves to both protect the components of the optical device and to perform light transformation within the optical device.

In other alternative embodiments, the substrate may include the functional components, or portions of the functional components, of the optical device. Thus, for example, the substrate may refer to a printed circuit board (PCB) or printed wiring board (PWB), including the electrical components (traces, capacitors, resistors, active devices, etc.) supported on or otherwise coupled to a support structure. In this regard, the substrate may also be considered to define an optical function for the optical device.

The term "disposed on", as provided herein, describes the relative orientation of the opto-physical material with respect to the substrate and is not intended to suggest that specific arrangement of the opto-physical material with respect to the substrate. In certain embodiments, intervening intermediate layers may be present between, or otherwise disposed between, the substrate and the opto-physical material.

In certain embodiments, the opto-physical material is disposed on the substrate by applying the curable coating composition directly or indirectly onto the substrate and curing the curable layer to form the opto-physical material that is adhered to the substrate.

Alternatively, the opto-physical material may be formed as a cured layer and subsequently be disposed on the substrate. In this regard, the opto-physical material may be formed separately by: i) shaping the curable matrix composition and ii) curing the curable matrix composition to form a opto-physical material for use in an optical device. Step i) may be performed by a process such as injection molding, transfer molding, casting, extrusion, overmolding, calendaring, compression molding, and cavity molding. The process selected for step i) will depend on various factors including the size and shape of the optical device to be produced and the composition selected.

In certain of these embodiments, the separately formed opto-physical material may be contacted with or adhered or otherwise fastened to the substrate. In still further alternative embodiments, the separately formed opto-physical material is disposed on the substrate by bringing the opto-physical material adjacent to the substrate but without physically contacting the substrate. In other embodiments, the separately formed opto-physical material is sandwiched between the substrate and other components of the optical device.

The present invention thus provides a method for effectively reducing ultraviolet light transmission through an opto-physical material without adversely altering desired optical physical properties (in terms of color, light transmission in the visible light spectrum, and/or light diffusivity) of the opto-physical material through the introduction of an effective amount of ultraviolet light additive (E). When used in an optical device, the opto-physical material therefore provides protection to the substrate and associated components of the optical device from ultraviolet light degradation without adversely affecting desired optical physical properties in terms of color, light transmission, and/or light diffusivity. In addition, the hardness of the opto-physical material, in certain embodiments having a Shore A hardness of at least 40, provides additional protection to the optical device, including the substrate, and prevents dirt and dust accumulation which might adversely affect optical properties of the opto-physical material and optical device. Alternatively, in certain embodiments when the opto-physical material has a Shore A hardness of 20 or less, the opto-physical material may be a soft, interconnect layer that provides gap filling and cushioning, as well as adhesion between various components of the optical device.

The opto-physical material may also be used in non-optical devices and applications, e.g., as a sealant, adhesive or filler. For example, the opto-physical material may be used to seal a porous soil material in construction or building applications.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention includes the following numbered aspects:

1. An opto-physical material comprising a curable matrix composition and an effective amount of an ultraviolet light additive dispersed therein, the opto-physical material having a refractive index ranging from 1 to 1.8 at 589 nm wavelength and a light transmission value of 30% or less at any wavelength in the ultraviolet light spectrum, wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, and wherein the optical physical property is selected from color shift in the visible light spectrum, light diffusivity at any wavelength in the light spectrum, light transmission in the visible light spectrum, and combinations thereof.

2. The opto-physical material according to aspect 1 having a Shore A hardness of at least 40 and formed by curing the curable matrix composition, the curable matrix composition comprising: (A) an organopolysiloxane having an average of greater than one aliphatically unsaturated organic group per molecule; (B) a crosslinker having an average of at least two silicon-bonded hydrogen atoms per molecule; (C) a hydrosilylation catalyst; and (D) a silicone resin having aliphatically unsaturated organic groups present in an amount, on average, ranging from 0.1 to 3.0 weight percent based upon the total weight of the silicone resin; wherein the molar ratio of silicon-bonded hydrogen atoms in component (B) to aliphatically unsaturated organic groups in components (A) and (D) has a value ranging from 1.0/1 to 3.0/1.

3. The opto-physical material according to aspect 1 having a Shore A hardness of at least 40 and formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule, wherein the molar ratio of silicon-bonded hydrogen atoms in component (B) to aliphatically unsaturated organic groups in component (A) has a value ranging from 1.0/1 to 3.0/1; and (C) a hydrosilylation catalyst.

4. The opto-physical material according to aspect 1 having a Shore A hardness of less than 20 and formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule; (C) a hydrosilylation catalyst; and (D) a silicone resin having aliphatically unsaturated organic groups present in an amount, on average, ranging from 0.1 to 3.0 weight percent based upon the total weight of the silicone resin; wherein the molar ratio of silicon-bonded hydrogen atoms in component (B) to aliphatically unsaturated organic groups in components (A) and (D) has a value ranging from 0.3/1 to 1.0/1.

5. The opto-physical material according to aspect 1 having a Shore A hardness of less than 20 and formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule, wherein the molar ratio of silicon-bonded hydrogen atoms in component (B) to aliphatically unsaturated organic groups in component (A) has a value ranging from 0.3/1 to 1.0/1; and (C) a hydrosilylation catalyst.

6. The opto-physical material according any one of aspects 2 to 5, wherein component (A) comprises: (A1) a first organopolysiloxane having an average of at least one aliphatically unsaturated organic group per molecule and having a viscosity of up to 15,000 mPa·s at 25 degrees Celsius, and (A2) a second organopolysiloxane having an average of at least two aliphatically unsaturated organic groups per molecule and having a viscosity of at least 2,000 mPa·s at 25 degrees Celsius.

7. The opto-physical material according to any one of aspects 1 to 6, wherein the ultraviolet light additive is selected from the group consisting of an ultraviolet light absorbing compound, a nanoparticulate ultraviolet light absorbing agent, a nanoparticulate ultraviolet light scattering agent, and combinations thereof.

8. The opto-physical material according to aspect 7, wherein the ultraviolet light additive further comprises a light stabilizer.

9. The opto-physical material according to any one of aspects 1 to 6, wherein the ultraviolet light additive is selected from the group consisting of hydroxybenzophenones, hydroxyphenyltriazines, hydroxybenzotriazoles, and combinations thereof.

10. The opto-physical material according to aspect 2 or 4, wherein the silicone resin (D) has a vinyl content of up to 3.0% by weight based upon the total weight of silicone resin (D).

11. The opto-physical material according to any one of aspects 2, 4 or 10, wherein the silicone resin comprises $R_3SiO_{1/2}$ units and $SiO_{4/2}$ units, wherein each R is independently a monovalent hydrocarbon group or a monovalent organic group with the proviso that on average at least one R per molecule is an alkenyl group and wherein the molar ratio of the $R_3SiO_{1/2}$ units to $SiO_{4/2}$ units has a value ranging from 0.5/1 to 2.0/1.

12. The opto-physical material according to any one of aspects 2, 4 or 10, wherein the silicone resin comprises $R_3SiO_{1/2}$ units, $R_2SiO_{2/2}$ units and $RSiO_{3/2}$ units, wherein each R is independently a monovalent hydrocarbon group or a monovalent organic group with the proviso that on average at least one R per molecule is an alkenyl group.

13. The opto-physical material according to any one of aspects 2 to 12, wherein the crosslinker comprises $R^2_3SiO_{1/2}$ units and $R^2_2SiO_{2/2}$ units, wherein each $R^2$ is independently a monovalent hydrocarbon group or a monovalent organic group or hydrogen with the proviso that at least two $R^2$ per molecule are hydrogen.

14. The opto-physical material according to any one of aspects 2 to 12, wherein the crosslinker comprises $R^2_3SiO_{1/2}$ units, $R^2_2SiO_{2/2}$ units, and $R^2SiO_{3/2}$ units, wherein each $R^2$ is independently a monovalent hydrocarbon group or a monovalent organic group or hydrogen with the proviso that at least two $R^2$ per molecule are hydrogen.

15. The opto-physical material according to any one of aspects 2 to 12, wherein the crosslinker comprises $R^2_3SiO_{1/2}$ units and $SiO_{4/2}$ units, wherein each $R^2$ is independently a monovalent hydrocarbon group or a monovalent organic group or hydrogen with the proviso that at least two $R^2$ per molecule are hydrogen.

16. The opto-physical material according to any one of aspects 1 to 15, wherein the opto-physical material has a light transmission value of at least 70% at any wavelength in the visible light spectrum.

17. An optical device comprising: a substrate; and an opto-physical material disposed on the substrate, the opto-physical material comprising a curable matrix composition and an effective amount of an ultraviolet light additive dispersed therein, the opto-physical material having a refractive index ranging from 1 to 1.8 at 589 nm wavelength and a light transmission value of 30% or less at any wavelength in the ultraviolet light spectrum, wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, and wherein the optical physical property is selected from color shift in the visible light spectrum, light diffusivity at any wavelength in the light spectrum, light transmission in the visible light spectrum, and combinations thereof.

18. The optical device according to aspect 17, wherein the opto-physical material has a Shore A hardness of at least 40 and is formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule; (C) a hydrosilylation catalyst; and (D) a silicone resin having aliphatically unsaturated organic groups present in an amount, on average, ranging from 0.1 to 3.0 weight percent based upon the total weight of the silicone resin; wherein the molar ratio of silicon-bonded hydrogen atoms in component (B) to aliphatically unsaturated organic groups in components (A) and (D) has a value ranging from 1.0/1 to 3.0/1.

19. The optical device according to aspect 17, wherein the opto-physical material has a Shore A hardness of at least 40 and is formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule, wherein the molar ratio of silicon-bonded hydrogen atoms in component (B) to aliphatically unsaturated organic groups in component (A) has a value ranging from 1.0/1 to 3.0/1; and (C) a hydrosilylation catalyst.

20. The optical device according to aspect 17, wherein the opto-physical material has a Shore A hardness of less than 20 and is formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule; (C) a hydrosilylation catalyst; and (D) a silicone resin having aliphatically unsaturated organic groups present in an amount, on average, ranging from 0.1 to 3.0 weight percent based upon the total weight of the silicone resin; wherein the molar ratio of silicon-bonded hydrogen atoms in component (B) to aliphatically unsaturated organic groups in components (A) and (D) has a value ranging from 0.3/1 to 1.0/1.

21. The optical device according to aspect 17, wherein the opto-physical material has a Shore A hardness of less than 20 and is formed by curing the curable matrix composition, the curable matrix composition comprising: (A) an organopolysiloxane having an average of at least one aliphatically unsaturated organic group per molecule; (B) a crosslinker having an average of at least two silicon-bonded hydrogen atoms per molecule, wherein the molar ratio of silicon-bonded hydrogen atoms in component (B) to aliphatically unsaturated organic groups in component (A) has a value ranging from 0.3/1 to 1.0/1; and (C) a hydrosilylation catalyst.

22. The optical device according to any one of aspects 17 to 21, wherein the ultraviolet light additive is selected from the group consisting of an ultraviolet light absorbing compound, a nanoparticulate ultraviolet light absorbing agent, a nanoparticulate ultraviolet light scattering agent, and combinations thereof.

23. The optical device according to aspect 22, wherein the ultraviolet light additive further comprises a light stabilizer.

24. The optical device according to any one of aspects 17 to 21, wherein the ultraviolet light additive is selected from the group consisting of hydroxybenzophenones, hydroxyphenyltriazines, hydroxybenzotriazoles, and combinations thereof.

25. A method for forming an optical device comprising: providing an opto-physical material according to any one of aspects 1 to 16; and disposing the opto-physical material on a substrate.

The following examples are intended to illustrate the invention and are not to be viewed in any way as limiting to the scope of the invention.

EXAMPLES

These examples are intended to illustrate the invention to one of ordinary skill in the art and should not be interpreted as limiting the scope of the invention set forth in the claims.

Hardness was measured according to ASTM D2240 by the type A durometer. The Shore A value was measured five times for each sample, and the average reported for hardness.

Viscosity for each of the components was measured at 25 degrees Celsius.

Light transmission values and color shift values were measured five times for each sample using a Konica Minolta CM-5 Spectrophotometer.

An optically transparent coating material was prepared with and without ultraviolet light additives. The components were combined in a cup and mixed with a dental mixer or planetary mixer. The resulting composition was cured by injecting the respective material into a mold and heating the material to 150 degrees Celsius for about one hour to form a plaque having a thickness of about 3 mm. The plaques formed were then measured for hardness and light transmission values at wavelengths within the ultraviolet light spectrum (370 nm and 390 nm) and visible light spectrum (410 nm, 430 nm, 450 nm and 490 nm).

Plaques were deemed acceptable for light transmissive properties if they met the % transmission targets at each respective wavelength in both the ultraviolet light spectrum and visible light spectrum as shown in Table 2 below.

The relative compositions and the results of these experiments are summarized in Tables 1 and 2 below:

TABLE 1

Composition of optically transparent control material

| Component | Description | wt % |
|---|---|---|
| A1 | Vinyl-terminated PDMS (viscosity ~10,000 mPa) | 41.8 |
| A2 | Vinyl-terminated PDMS (viscosity ~60,000 mPa) | 13.8 |
| D | Silicone resin containing average 2 wt % unsaturated aliphatic groups | 39.5 |
| B | Crosslinker containing an average of 10 silicon-bonded hydrogen per molecule | 4.6 |
| C | Hydrosilylation catalyst (platinum complex) | 0.1 |
|   | Cure speed regulator (acetylenic alcohol) | 0.2 |
| E | UV blocking or absorbing additive(s) | 0.0 |
|   | Total | 100 |

Overall SiH to Unsaturated alkyl ratio = 1.3:1.0
Durometer = 70 shore A

TABLE 2

Effect of select UV blocking and absorbing additives on light transmission at various wavelengths

| % Transmission Target | | | Wavelength | | | |
|---|---|---|---|---|---|---|
| added wt % Tinuvin ® 400 | added wt % Tinuvin ® 384-2 | added wt % Tinuvin ® 123 | 370 nm <10 | 390 nm <30 | 410 nm >70 | 430 nm >85 |
| 0.0 | 0.0 | 0.0 | 92.6 | 92.8 | 93.2 | 93.4 |
| 0.10 | 0.0 | 0.0 | 5.7 | 74.1 | 89.0 | 92.1 |
| 1.00 | 0.0 | 0.0 | 0.0 | 0.3 | 14.2 | 31.3 |
| 0.0 | 0.10 | 0.0 | 0.0 | 41.7 | 88.9 | 91.3 |
| 0.0 | 0.20 | 0.0 | 0.0 | 16.4 | 86.3 | 90.3 |
| 0.0 | 1.00 | 0.0 | 0.0 | 2.0 | 73.3 | 88.0 |
| 0.0 | 0.0 | 1.00 | 89.9 | 90.6 | 91.3 | 91.7 |

TABLE 2-continued

Effect of select UV blocking and absorbing additives on light transmission at various wavelengths

| 0.0 | 0.16 | 0.09 | 0.0 | 28.2 | 88.7 | 91.5 |
| 0.0 | 1.00 | 0.50 | 0.0 | 4.8 | 73.4 | 89.1 |

| | % Transmission Target | | | | |
|---|---|---|---|---|---|
| added wt % Tinuvin® 400 | added wt % Tinuvin® 384-2 | added wt % Tinuvin® 123 | Wavelength | | Comment |
| | | | 450 nm >90 | 590 nm >90 | |
| 0.0 | 0.0 | 0.0 | 93.5 | 94.0 | Control material (no additive) |
| 0.10 | 0.0 | 0.0 | 92.9 | 94.0 | insufficient blocking |
| 1.00 | 0.0 | 0.0 | 38.2 | 46.9 | reduced transmission |
| 0.0 | 0.10 | 0.0 | 92.2 | 94.1 | insufficient blocking |
| 0.0 | 0.20 | 0.0 | 91.5 | 93.8 | good |
| 0.0 | 1.00 | 0.0 | 89.6 | 93.7 | reduced transmission |
| 0.0 | 0.0 | 1.00 | 91.9 | 93.1 | insufficient blocking |
| 0.0 | 0.16 | 0.09 | 92.3 | 94.0 | good |
| 0.0 | 1.00 | 0.50 | 90.3 | 94.0 | good |

Insufficient blocking, as described in Table 2 above, refers to samples having greater than 30% transmission of light at 390 nm. Reduced transmission refers to samples having a greater than a 5% change in transmission of light at any of the measured values in the visible range from the control. Good refers to samples meeting the criteria for light transmission in the UV range and change in transmission from the control at each of the measured values.

As Table 2 confirms, the addition of the UV light absorber Tinuvin® 384-2 at a 0.2% level (based upon the total weight of the composition), and certain combinations of the UV light absorber Tinuvin® 384-2 and the hindered light amine stabilizer Tinuvin® 123, provided acceptable light transmission blocking values of less than 30% for certain wavelengths of light in the ultraviolet light spectrum and acceptable light transmission values of 70% or 90% for wavelengths of light in the visible light spectrum.

Next, in Table 3, color shift change for representative samples were evaluated using the UV light absorber Tinuvin® 384-2 in combination with the hindered light amine stabilizer Tinuvin® 123 at various levels. The results are summarized below:

TABLE 3

Reduction in color shift by addition of Tinuvin® 123

| added wt % Tinuvin® 384-2 | added wt % Tinuvin® 123 | L*(D65) | a*(D65) | b*(D65) | COMMENT |
|---|---|---|---|---|---|
| 0.0 | 0.0 | 97.70 | 0.00 | 0.27 | Control (no additive) |
| 0.01 | 0.0 | 97.68 | −0.17 | 0.71 | |
| 0.01 | 0.005 | 97.63 | −0.14 | 0.68 | reduced b* and a* shift as compared to sample without Tinuvin 123 (row 2) |
| 0.10 | 0.0 | 97.62 | −0.46 | 1.51 | |
| 0.10 | 0.05 | 97.50 | −0.36 | 1.31 | reduced b* and a* shift as compared to sample without Tinuvin 123 (row 4) |
| 1.00 | 0.0 | 97.46 | −1.14 | 3.24 | |
| 1.00 | 0.50 | 97.47 | −0.92 | 2.76 | reduced b* and a* shift as compared to sample without Tinuvin 123 (row 6) |

As Table 3 confirms, the combination of the hindered amine light stabilizer Tinuvin® 123 and the UVA light absorber Tinuvin® 384-2 reduced color shift in terms of b* and a* shift as compared with the use of the UVA light absorber Tinuvin® 384-2 alone. In the description a reduced b* value indicated less yellow shift, a reduced a* value indicated a reduced red shift, and L* values indicated lightness.

Next, the stability of light transmission results after heat aging and ultraviolet light exposure was evaluated. As Table 4 confirms, the introduction of the UV light stabilizer Tinuvin® 123 and the UV light absorber Tinuvin® 384-2 to the silicone compositions at levels in accordance with the present invention did not significantly alter the light transmission properties of the resultant cured layer at various levels in both the ultraviolet light spectrum and visible light spectrum, which suggests the stability of the resultant cured layers.

TABLE 4

Stability of light transmission results

| Control with 0.01 wt % Tinuvin ® 384-2 and 0.005 wt % Tinuvin ® 123 | % change from transmission measured at: | | | |
|---|---|---|---|---|
| | 390 nm | 410 nm | 430 nm | 590 nm |
| Heat-aging 150° C., 600 hrs | 0% | −1% | −1% | 0% |
| UV exposure, 1000 hrs | 4% | 0% | −1% | 0% |

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described. Unless stated otherwise herein, all light transmission values are measured through a 3.0 millimeter thick test sample, e.g., of the opto-physical material.

What is claimed is:

1. An opto-physical material comprising a curable matrix composition and an effective amount of an ultraviolet light additive dispersed therein, the opto-physical material having a Shore A hardness of at least 40, a refractive index ranging from 1 to 1.8 at 589 nm wavelength, a light transmission value of 30% or less at any wavelength in the ultraviolet light spectrum, and is formed by curing the curable matrix composition, the curable matrix composition comprising:
   (A) an organopolysiloxane having an average of at least one aliphatically unsaturated organic group per molecule;
   (B) a crosslinker having an average of at least two silicon-bonded hydrogen atoms per molecule, wherein the molar ratio of silicon-bonded hydrogen atoms in component (B) to aliphatically unsaturated organic groups in component (A) has a value ranging from 1.0/1 to 3.0/1; and
   (C) a hydrosilylation catalyst, and
   wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, and wherein the optical physical property is selected from color shift in the visible light spectrum, light diffusivity at any wavelength in the light spectrum, light transmission in the visible light spectrum, and combinations thereof.

2. The opto-physical material according to claim 1, wherein the curable matrix composition further comprises
   (D) a silicone resin having aliphatically unsaturated organic groups present in an amount, on average, ranging from 0.1 to 3.0 weight percent based upon the total weight of the silicone resin;
   wherein the molar ratio of silicon-bonded hydrogen atoms in component (B) to aliphatically unsaturated organic groups in components (A) and (D) has a value ranging from 1.0/1 to 3.0/1; and
   wherein the organopolysiloxane has an average of greater than one aliphatically unsaturated organic group per molecule.

3. The opto-physical material according to claim 1, wherein component (A) comprises:
   (A1) a first organopolysiloxane having an average of at least one aliphatically unsaturated organic group per molecule and having a viscosity of up to 15,000 mPa·s at 25 degrees Celsius, and
   (A2) a second organopolysiloxane having an average of at least two aliphatically unsaturated organic groups per molecule and having a viscosity of at least 2,000 mPa·s at 25 degrees Celsius.

4. The opto-physical material according to claim 1, wherein the ultraviolet light additive is selected from the group consisting of an ultraviolet light absorbing compound, a nanoparticulate ultraviolet light absorbing agent, a nanoparticulate ultraviolet light scattering agent, and combinations thereof.

5. The opto-physical material according to claim 4, wherein the ultraviolet light additive further comprises a light stabilizer.

6. The opto-physical material according to claim 1, wherein the ultraviolet light additive is selected from the group consisting of hydroxybenzophenones, hydroxyphenyltriazines, hydroxybenzotriazoles, and combinations thereof.

7. An optical device comprising:
   a substrate; and
   an opto-physical material disposed on the substrate, the opto-physical material comprising a curable matrix composition and an effective amount of an ultraviolet light additive dispersed therein, the opto-physical material having a refractive index ranging from 1 to 1.8 at 589 nm wavelength and a light transmission value of 30% or less at any wavelength in the ultraviolet light spectrum, wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, and wherein the optical physical property is selected from color shift in the visible light spectrum, light diffusivity at any wavelength in the light spectrum, light transmission in the visible light spectrum, and combinations thereof; wherein the opto-physical material is as in claim 1.

8. A method for forming an optical device comprising:
   providing an opto-physical material according to claim 1; and
   disposing the opto-physical material on a substrate.

9. An opto-physical material comprising a curable matrix composition and an effective amount of an ultraviolet light additive dispersed therein, the opto-physical material having a Shore A hardness of less than 20, a refractive index ranging from 1 to 1.8 at 589 nm wavelength, a light transmission value of 30% or less at any wavelength in the ultraviolet light spectrum, and is formed by curing the curable matrix composition, the curable matrix composition comprising:
   (A) an organopolysiloxane having an average of at least one aliphatically unsaturated organic group per molecule;
   (B) a crosslinker having an average of at least two silicon-bonded hydrogen atoms per molecule, wherein the molar ratio of silicon-bonded hydrogen atoms in component (B) to aliphatically unsaturated organic groups in component (A) has a value ranging from 0.3/1 to 1.0/1;and
   (C) a hydrosilylation catalyst, wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, and wherein the optical physical property is selected from color shift in the visible light spectrum, light diffusivity at any wavelength in the light spectrum, light transmission in the visible light spectrum, and combinations thereof.

10. The opto-physical material according to claim 9 wherein the curable matrix composition further comprises (D) a silicone resin having aliphatically unsaturated organic groups present in an amount, on average, ranging from 0.1 to 3.0 weight percent based upon the total weight of the silicone resin; and wherein the molar ratio of silicon-bonded hydrogen atoms in component (B) to aliphatically unsaturated organic groups in components (A) and (D) has a value ranging from 0.3/1 to 1.0/1.

11. The opto-physical material according to claim 9, wherein component (A) comprises:
(A1) a first organopolysiloxane having an average of at least one aliphatically unsaturated organic group per molecule and having a viscosity of up to 15,000 mPa·s at 25 degrees Celsius, and
(A2) a second organopolysiloxane having an average of at least two aliphatically unsaturated organic groups per molecule and having a viscosity of at least 2,000 mPa·s at 25 degrees Celsius.

12. The opto-physical material according to claim 9, wherein the ultraviolet light additive is selected from the group consisting of an ultraviolet light absorbing compound, a nanoparticulate ultraviolet light absorbing agent, a nanoparticulate ultraviolet light scattering agent, and combinations thereof.

13. The opto-physical material according to claim 12, wherein the ultraviolet light additive further comprises a light stabilizer.

14. The opto-physical material according to claim 9, wherein the ultraviolet light additive is selected from the group consisting of hydroxybenzophenones, hydroxyphenyltriazines, hydroxybenzotriazoles, and combinations thereof.

15. An optical device comprising:
a substrate; and
an opto-physical material disposed on the substrate, the opto-physical material comprising a curable matrix composition and an effective amount of an ultraviolet light additive dispersed therein, the opto-physical material having a refractive index ranging from 1 to 1.8 at 589 nm wavelength and a light transmission value of 30% or less at any wavelength in the ultraviolet light spectrum, wherein a test value of an optical physical property for the opto-physical material does not differ by more than 5% from a predetermined value of the optical physical property when the predetermined value is measured under the same measurement conditions for an opto-physical material comprising a comparative curable matrix composition lacking the ultraviolet light additive, and wherein the optical physical property is selected from color shift in the visible light spectrum, light diffusivity at any wavelength in the light spectrum, light transmission in the visible light spectrum, and combinations thereof; wherein the opto-physical material is as in claim 9.

16. A method for forming an optical device comprising:
providing an opto-physical material according to claim 9; and
disposing the opto-physical material on a substrate.

* * * * *